(12) United States Patent
Lee

(10) Patent No.: US 6,824,170 B2
(45) Date of Patent: Nov. 30, 2004

(54) SELF-LOCKING COUPLING DEVICE

(75) Inventor: Frank Ching King Lee, Hacienda Heights, CA (US)

(73) Assignee: Airdrome Parts Co., Long Beach, CA (US)

( * ) Notice: Subject to any disclaimer, the term of this patent is extended or adjusted under 35 U.S.C. 154(b) by 0 days.

(21) Appl. No.: 10/355,441

(22) Filed: Jan. 30, 2003

(65) Prior Publication Data

US 2004/0150224 A1 Aug. 5, 2004

(51) Int. Cl.$^7$ .................... F16L 37/088; F16L 55/00
(52) U.S. Cl. ................... 285/92; 285/314; 285/81
(58) Field of Search .................. 285/314, 81, 92, 285/90, 91, 88, 86

(56) References Cited

U.S. PATENT DOCUMENTS

| | | | | |
|---|---|---|---|---|
| 464,386 | A | * 12/1891 | Patterson | 285/314 |
| 592,899 | A | * 11/1897 | Wilson | 285/314 |
| 965,286 | A | * 7/1910 | Ferguson | 285/34 |
| 1,312,584 | A | 8/1919 | Scott | |
| 1,534,173 | A | * 4/1925 | Fogelberg | 285/277 |
| 1,868,587 | A | * 7/1932 | Richards | 464/177 |
| 2,226,547 | A | 12/1940 | Boynton | |
| 2,361,827 | A | * 10/1944 | Dowell | 285/314 |
| 2,449,920 | A | * 9/1948 | Williams | 285/314 |
| 2,784,987 | A | 3/1957 | Corcoran | |
| 3,083,042 | A | * 3/1963 | Collar | 285/93 |
| 3,191,972 | A | * 6/1965 | Collar | 285/93 |
| 3,442,541 | A | * 5/1969 | Metz | 403/316 |
| 3,926,532 | A | * 12/1975 | Schlenker et al. | 403/322.2 |
| 4,289,340 | A | 9/1981 | Press et al. | |
| 4,293,150 | A | 10/1981 | Press | |
| 4,392,759 | A | * 7/1983 | Cook | 403/11 |
| 4,790,571 | A | 12/1988 | Montanari et al. | |
| 4,995,643 | A | 2/1991 | Rappart et al. | |
| 5,058,930 | A | 10/1991 | Schlosser | |
| 5,083,819 | A | 1/1992 | Bynum | |
| 5,116,088 | A | 5/1992 | Bird | |
| 5,356,181 | A | 10/1994 | Shirogane et al. | |
| 5,362,110 | A | 11/1994 | Bynum | |
| 5,372,393 | A | 12/1994 | Austin | |
| 5,503,437 | A | 4/1996 | Cronley | |
| 5,586,790 | A | 12/1996 | Bynum | |
| 5,749,606 | A | 5/1998 | Lu et al. | |
| 5,823,702 | A | 10/1998 | Bynum | |
| 6,302,447 | B1 | 10/2001 | Lee | |
| 6,478,343 | B2 | 11/2002 | King Lee | |

FOREIGN PATENT DOCUMENTS

IT                352880         12/1937

* cited by examiner

Primary Examiner—Eric K. Nicholson
(74) Attorney, Agent, or Firm—Fulwider Patton Lee & Utecht LLP

(57) ABSTRACT

A self-locking coupling device for coupling to a fitting having a radially outwardly facing groove using a coupling body with a central bore and an axially extending collar having a throughbore including a spring and actuating pin with a locking tab and further having first and second catches corresponding to and engageable with first and second slots in a rotatable locking ring mounted concentrically about the collar so as to position the locking tab within the throughbore in an unlocked position and within the central bore in a locked position so as to restrict the axial movement of the coupling body relative to the fitting when the groove is radially aligned with the pin.

21 Claims, 3 Drawing Sheets

SELF-LOCKING COUPLING DEVICE

FIELD OF THE INVENTION

This invention relates to devices and in particular fluid line coupling devices which are suitable for connecting pneumatic line segments, hydraulic lines segments, fuel line segments or other fluid line segments, tubes, ducts, conduits, and the like. More specifically, this invention relates to self-locking coupling devices which are designed to prevent inadvertent disassembly and as a result are capable of operating in severe vibrational and thermal cycling environments while maintaining a leak-free fluid connection.

BACKGROUND OF THE INVENTION

A variety of coupling devices are known in the art for connecting pressurized fluid line segments and the like. Many of these devices have been specifically designed to prevent inadvertent disassembly and catastrophic leakage during operation. These devices include conventional lockwire fluid fittings which consist of threaded fittings coupled together by wired fasteners which prevent the nut components from loosening during operation. However, conventional lockwire fluid fittings are labor intensive to install and as a result are not a preferred coupling system where multiple couplings are required in a single installation.

Other devices include, for example, U.S. Pat. No. 5,083,819 to Bynum which discloses a threaded fluid coupling equipped with a fastener capture device. The coupling devices comprises an internally threaded female fitting formed with external flats about its circumference and an externally threaded male fitting configured with a plurality of tangs mounted above the external threads in a circumferential fashion. Upon engagement of the male and female fittings, the tangs contact the flats with an interference fit and rachet about the junctions between the flats until the fittings are securely coupled. Once coupled, the tangs and the flats cooperate to inhibit rotation of the nut relative to the mating fitting to prevent an inadvertent disassembly of the coupling.

U.S. Pat. No. 5,058,930 to Schlosser discloses a pressurized fluid coupling device consisting of a coupling component with internal threads which engage the external threads of a nipple. The coupling component includes a cylindrical arrangement of cantilevered fingers with bulbous tips at their ends projecting radially inward which, upon engagement of the respective internal and external threads, ride up a frustoconical ramping surface on the nipple until the tips drop into an annular groove in the nipple wall. Cantilevered forces in the fingers created as the bulbous tips press against the threads and serve to minimize the effects of vibration thereupon. The bulbous tips seated in the annular groove are intended to prevent a complete disconnecting of the coupling component from the nipple, a separation which could cause catastrophic leakage at the joint.

Although the above described coupling devices can be used effectively in some applications, these devices lack positive locking features and as a result can be disconnected by simply applying a torsional force to the coupling members sufficient to overcome the retaining features which are intended to inhibit relative rotation and prevent disassembly of the coupling.

What continues to be needed and hereto unavailable is an improved self-locking coupling device, which, once securely coupled, resists disconnection due to torsional forces applied to the respective coupling members.

SUMMARY OF THE INVENTION

In accordance with a preferred embodiment of the present invention, a self-locking coupling device for coupling to a fitting having a radially outwardly facing groove is provided with a coupling body having a central bore and an axially extending collar including a radially projecting throughbore with retention shoulder and a spring element positioned in the throughbore with one end abutting the retention shoulder. An actuating pin including a radially projecting stem terminating in a locking tab and first and second catches proximate an opposing end with the pin inserted through the spring element and radially outwardly biased thereby. A rotatable locking ring mounted concentrically about the collar in close fitting relationship includes a first slot and a second slot corresponding respectively to the first and second catches. The locking ring is operable to rotate relative to the collar to engage the first catch with the first slot to dispose the locking tab within the throughbore and also operable to rotate so as to engage the second catch with the second slot to dispose the locking tab within the central bore to engage, when axially aligned with the groove of the fitting to restrict axial displacement of the coupling body relative to the fitting.

In another aspect of the present invention, a threaded head portion is provided for coupling a threaded fitting to the grooved fitting via the coupling body.

Yet another aspect of the present invention is the inclusion of a bendable retention flange at the free end of the collar for restraining the locking ring.

Another feature of the present invention provides an indicator indicating the position of the locking tab when the pin engages one of the slots.

Another aspect of the present invention may be found in the provision of a radially projecting exterior button atop the pin which extends through first slot when the pin is in a locked position and projects into the second slot when the pin is in an unlocked position.

Another feature of the present invention is a stop shoulder in said axially projecting bore to engage an alignment shoulder on the grooved fitting when inserted into the coupling body to axially align the groove with the pin.

In one embodiment of the present invention the pin includes a multi-tiered enlarged latch head for engaging the slots.

Other aspects of the present invention will become apparent with further reference to the following drawings and specification.

DETAILED DESCRIPTION OF THE PREFERRED EMBODIMENTS

Figure 1:
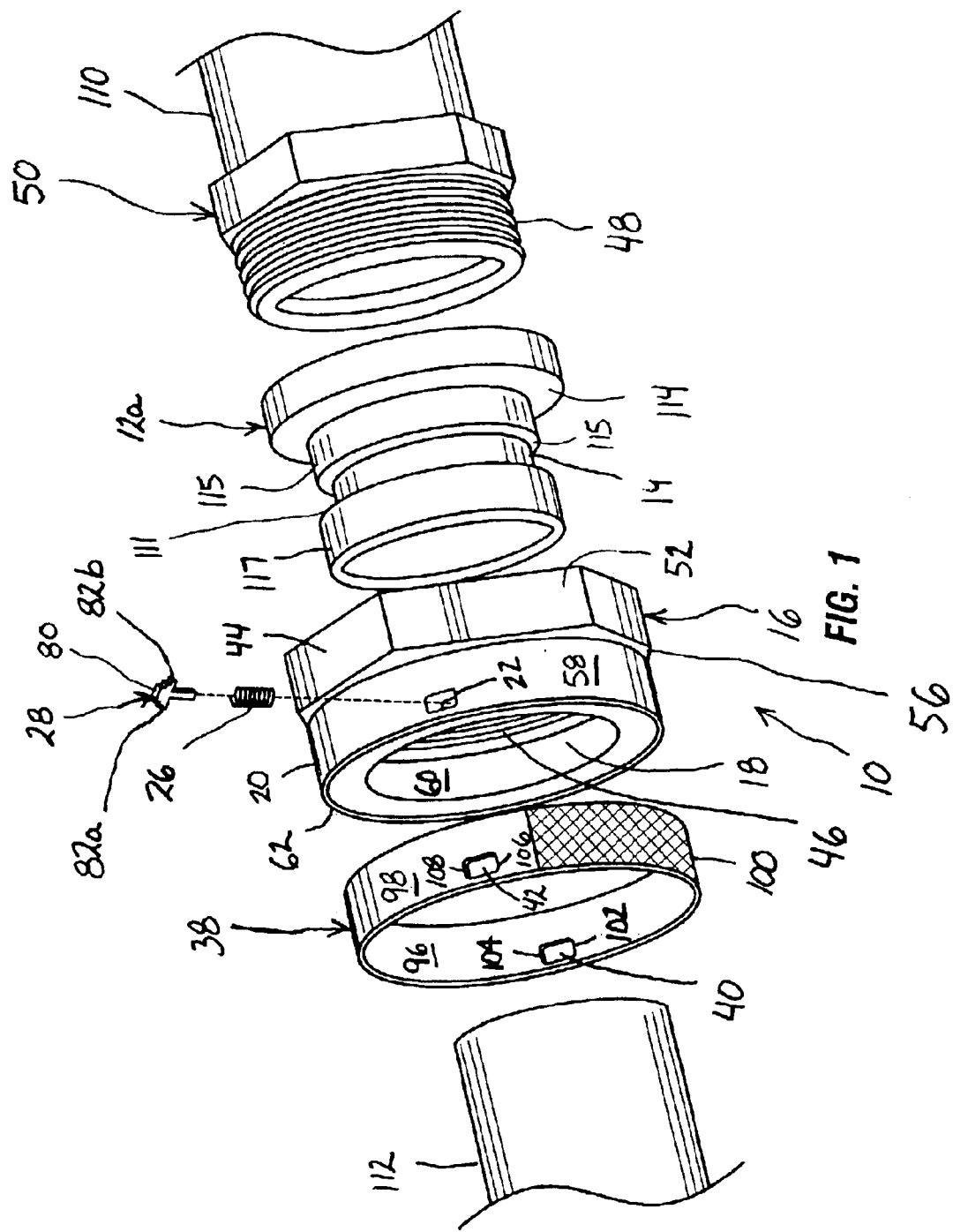
FIG. 1 is a perspective, exploded view of a self-locking coupling device in a preferred embodiment of the present invention.
Figure 2:
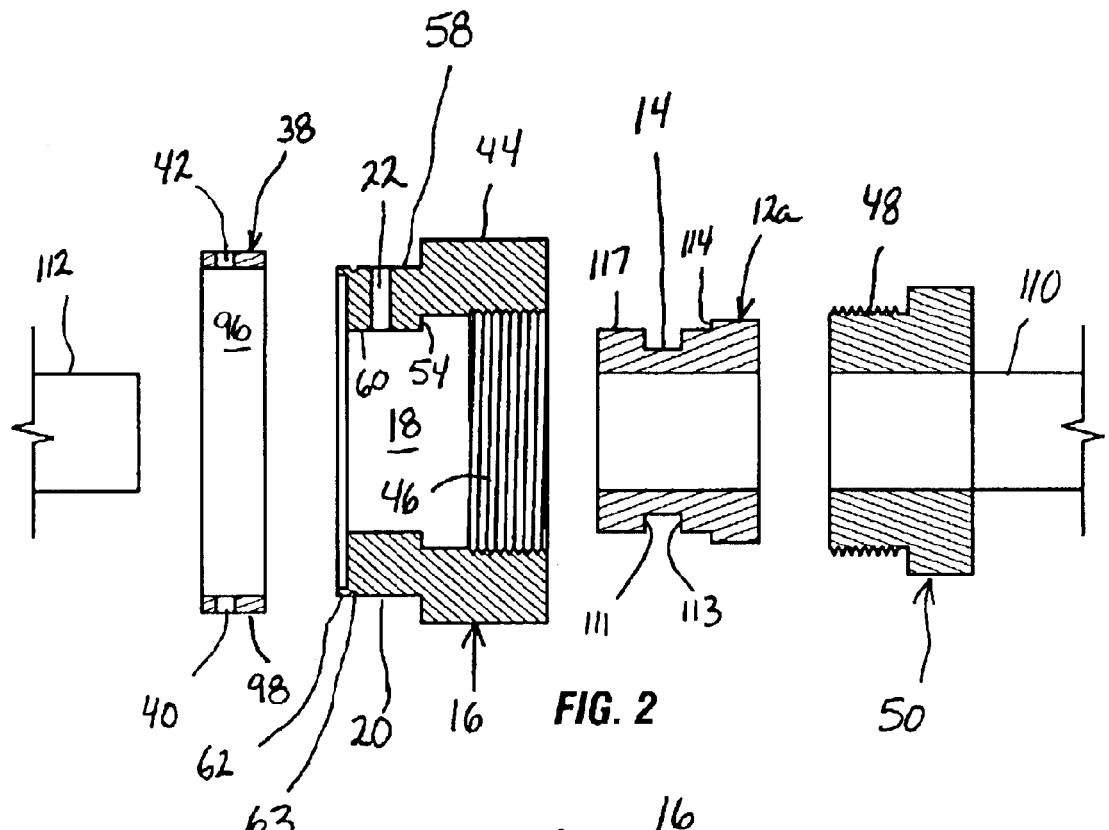
FIG. 2 is a transverse sectional view, in enlarged scale, passing through the diametrically opposed slots and the throughbore of the self-locking coupling device of FIG. 1.
Figure 5:
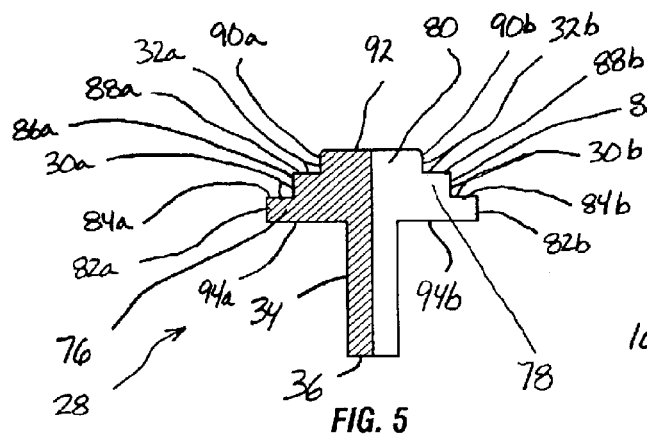
FIG. 5 is a left hand end view, in enlarged scale, of the locking pin of the preferred embodiment illustrated in FIG. 1.

Referring now to FIGS. 1–2 and 5, a preferred embodiment of the present invention in the form of a self-locking coupling device, generally designated 10, for coupling to a fitting, generally designated 12, and including a radially outwardly facing annular groove 14, is provided with a coupling body 16 having a central longitudinally projecting bore 18 and an axially extending collar 20 with at least one radially projecting throughbore 22 including a retention shoulder 24 abutting one end of a spring element 26 positioned in the throughbore and receiving an actuating pin 28 with a first catch 30 and second catch 32 positioned opposite a radially projecting stem 34 terminating in a locking tab 36. A rotatable locking ring 38, including an unlocking slot 40 corresponding to the first catch 30 and a locking slot 42 corresponding to the second catch 32, is mounted concentrically about the collar in close fitting relationship and is operable to rotate to engage the first catch with the unlocking slot to dispose the locking tab within the throughbore and may also rotate so as to engage the second catch with the locking slot to dispose the locking tab within the central bore to restrict the axial displacement of the coupling body relative to the grooved fitting when the locking tab is axially aligned with the groove.

An exemplary coupling device according to the present invention will now be described. Referring to FIGS. 1–2, the coupling body 16 is an elongated, hollow body with the longitudinally projecting central bore 18 projecting axially through the body forming a cylindrical interior. For purposes of this description, the axial and longitudinal directions are the same and the transverse direction is perpendicular to the axial direction as viewed into the paper in FIGS. 2, 3, 4A, and 4C or across the paper as viewed in FIGS. 4B and 4D.

Figure 3:
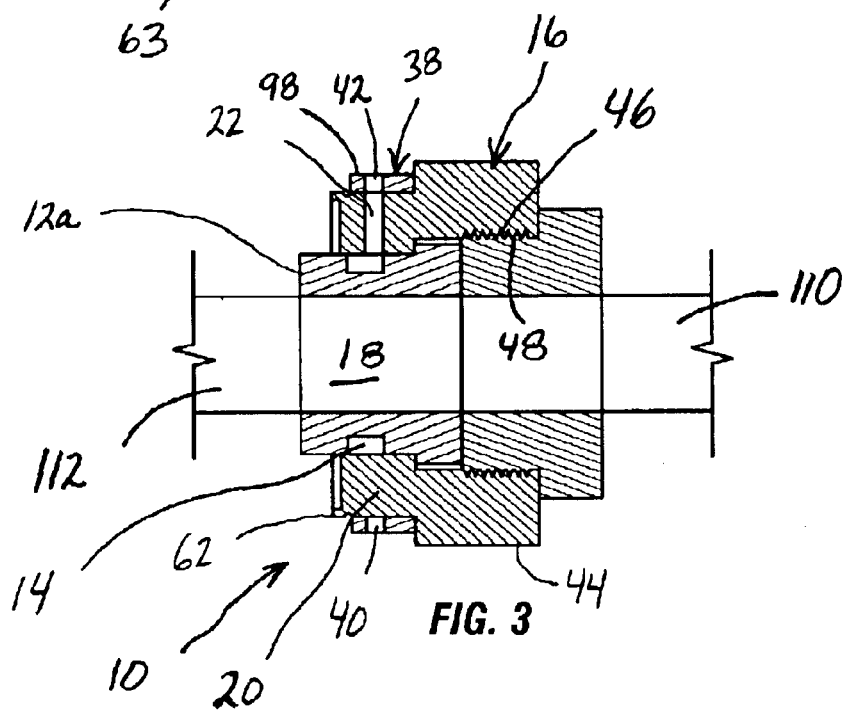
FIG. 3 is a transverse sectional view, in enlarged scale, of a self-locking coupling device engaged with a grooved fitting and a threaded fitting.

Still referring to FIGS. 1–2, the right hand end, as viewed in FIG. 2, of the coupling body 16 includes a nut-shaped head section 44 with an interior threaded region 46 for receiving the external threads 48 of another fitting, generally designated 50, and an exterior six-sided faceted region 52 for manipulation by a tool such as a wrench, pliers, other suitable tool for turning or holding in place a faceted body. As viewed in FIG. 2, the right hand edge of the threaded region 46 terminates in a stop shoulder 54 to restrict axial movement of the grooved fitting 12 into the coupling body 16 and align the groove 14 with the locking tab 36 as will be explained in more detail below. For purposes of the exemplary embodiments described herein, the grooved fitting 12a as illustrated in FIGS. 1–3 is constructed similarly the grooved fitting 12b illustrated in FIGS. 4A–4D with respect to the groove, spacer, alignment shoulder, and conduit attachment section and will be treated interchangeably throughout this description. Such fittings 12a, 12b, commonly designated 12, merely provide illustrative examples of grooved fittings and are not meant to limit the scope of the present invention.

With continued reference to FIGS. 1–2, extending axially from the right end of the head section 44 is the collar 20 over which the locking ring 38 rotates and engages the actuating pin 28. On the exterior of the coupling body 16, the collar 20 is separated from the head section 44 by an enlarged flange 56. The exterior surface 58 of the collar is relatively smooth to facilitate sliding of the locking ring. The interior surface 60 of the collar section is also relatively smooth. Both the exterior surface and interior surface of the collar are of a fixed diameter.

As viewed in FIGS. 1–2, the left hand end of the collar includes a bendable flange 62 which projects in a substantially axial direction when initially manufactured but may be bent, rolled, pressed, folded, flattened, or otherwise directed upwardly in a substantially radial direction to secure the locking ring 38 between the upwardly bent flange 62 and the enlarged flange 56 when the locking ring is mounted on the collar while allowing the locking ring to rotate relative to the collar. An annular depression 63 (FIG. 4A) adjacent the flange 62 facilitates bending of the flange toward the locking ring. It will be appreciated that only a portion of the bendable flange may be bent to prevent the locking ring from being removed from the collar.

Figure 4A:
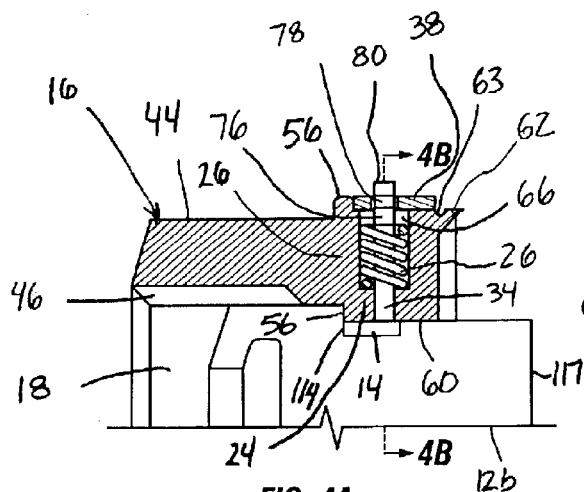
FIG. 4A is partial transverse sectional view illustrating the actuating pin in an unlocked position with a grooved fitting.
Figure 4B:
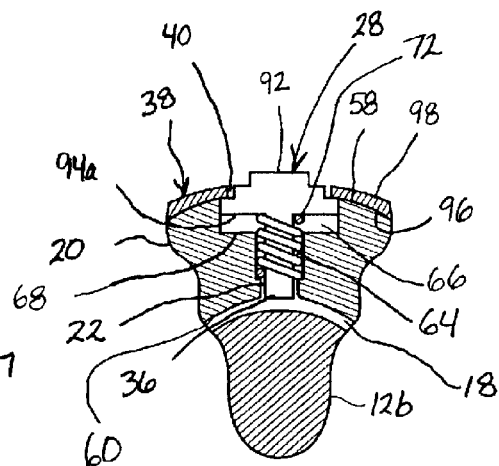
FIG. 4B is a partial axial cross-sectional view, in enlarged scale, taken along lines 4B—4B of FIG. 4A
Figure 4C:
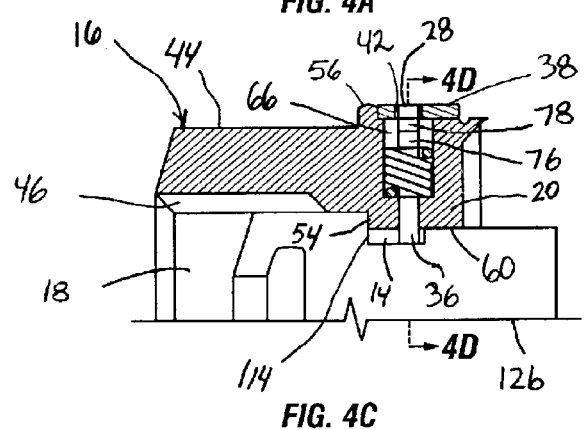
FIG. 4C is a partial transverse sectional view illustrating the actuating pin in a locked position with a grooved fitting.

Referring now to FIGS. 2 and 4A–4D, projecting radially through the coupling body 16 within the collar section 20 is the throughbore 22 having a dual chamber configuration which provides a passage between the exterior surface 58 and interior surface 60 of the collar for the locking pin 28 to enter the central bore 18 as will be described below. The spring retention chamber 64 is a substantially rectangularly shaped, radial interior passage in the throughbore and includes the retention shoulder 24 proximate the interior surface 60 of the coupling body 16. The retention shoulder 24 projects inwardly from the radially projecting side walls of the spring retention chamber 64 and provides a base for the sides of the spring element 26 to abut but does not inhibit passage of the stem 34 and locking tab 36 into the central bore 18. The radial outermost chamber or latch chamber 66 is substantially rectangular in shape but is larger in transverse cross section, as viewed in FIGS. 4B and 4D, than the spring retention chamber 64. The bottom wall 68 of the latch chamber prevents the enlarged head of the actuating pin 28, from passing into the spring retention chamber 64. The height, as measured in the radial direction, of the latch chamber 66 is sufficiently sized to allow outermost edge 92 of the actuating pin 28, when depressed, to be positioned radially interior of interior surface 96 of the locking ring 38 to inhibit the actuating pin 28 from interfering with the rotation of the locking ring 38 about the collar 20 as will be described below. The transverse width of the throughbore 22 is the same for both the spring retention chamber 64 and latch chamber 66 when viewed in side profile (FIGS. 4A and 4C). The chambers 64 and 66 may also be cylindrical.

Referring now to FIGS. 1 and 4A–4D, in this exemplary embodiment, the spring element 26 is a coil spring including a first end 70 positioned within the spring retention chamber 64 abutting the retention shoulder 24 and second opposing end 72 for supporting the enlarged latch head 74 of the actuating pin 28. The retention shoulder 24 prevents the spring element from moving into the central bore 18. It will be appreciated that a leaf spring with a central aperture and having its ends anchored within the throughbore 22 could be used as well. A wave spring may also provide a suitable substitute. A suitable spring constant may be selected to alter the frictional forces between the actuating pin 28 and locking ring 38 as desired.

Turning now to FIGS. 1, 4A–4D and particularly to FIG. 5, the actuator for locking together a grooved fitting 12 with the coupling body 16 is a dual position actuating pin 28. As viewed in FIG. 5, the pin 28 has a generally a multi-tiered T-shaped in transverse cross-section. The pin 28 includes the narrow stem 34 terminating in the locking tab 36 at its radial innermost end, when positioned in the throughbore (FIGS. 4A–4D) which may project into the central bore 18 when the pin is depressed. Atop the narrow stem is an enlarged latch head 74 including a series of consecutively narrowed tiers forming a series of shoulders and edges. More specifically, a first tier 76 underlies a second tier 78 which underlies a top tier 80 or button as viewed in FIG. 5. The first tier 76 is wider in transverse cross section than the second tier 78 which is wider in transverse cross section than the button 80.

With particular reference to FIG. 5, the first tier 76 includes opposing transversely outwardly facing edges 82*a*, 82*b* and opposing exposed radially outwardly facing edges 84*a*, 84*b*. In a similar manner, the second tier 78 includes opposing transversely outwardly facing edges 86*a*, 86*b* and opposing exposed radially outwardly facing edges 88*a*, 88*b*. The third or top tier includes opposing transversely outwardly facing edges 90*a*, 90*b* and a single radially outwardly facing region 92 accessible to the operator for depressing the button 80 of the actuating pin 28. Edges 82*a*, 82*b* are spaced further apart in the transverse direction, as viewed in FIG. 5 across the page, than edges 86*a*, 86*b* which are in turn spaced further apart in the same direction than opposing edges 90*a*, 90*b*. Thus, the transverse length of the first tier 76 is greater than the transverse length of the second tier 78 which is greater in transverse length than the top tier 80 or button. Edges 84*a*, 84*b*, 86*a*, 86*b*, 88*a*, 88*b*, 90*a*, and 90*b* form working surfaces to engage the locking ring 38 to provide the locking and unlocking features described herein. More specifically, edges 84*a* and 86*a* form an L-shaped catch surface 30*a* and opposing edges 84*b* and 86*b* form an opposing L-shaped catch surface 30*b*. Together, these L-shaped catch surfaces 30*a*, 30*b* form the first catch 30 which is sized to engage the unlocking slot 40. Similarly, the edges 88*a* and 90*a* form an L-shaped catch surface 32*a* and edges 88*b* and 90*b* cooperate to form an opposing L-shaped catch surface 32*b*. These catch surfaces 32*a*, 32*b* thus cooperate to form the second catch 32 which is sized to engage the locking slot 42. The surface 92 is a working surface and is exposed to provide a depressable surface when said latch head 74 is engaged with either one of the slots 40 and 42. While the button 80 may have rectangular shoulders, it is preferable to round and raise the shoulders to improve the interaction between the pin and sidewalls of the slots of the locking ring and provide a larger surface area for the operator to depress as will be described below. The bottom edges 94*a*, 94*b* of the latch 74 project transversely from the stem 34 to provide a radially inwardly stop surface.

As viewed in FIGS. 4A and 4C, the actuating pin 28 has a relatively narrow rectangular profile (axial width) compared with its transverse cross-sectional view in FIG. 5 and is slightly less than the axial width of the slots 40 and 42. The locking tab 36 is selected with a suitable axial width, when viewed in FIGS. 4A and 4C, of less than the axial width of the groove 14 in the fitting 12 to limit the axial displacement of the coupling body relative to the fitting. The closer the axial width of the locking tab is to the axial width the groove, the less axial relative movement or play between the coupling and fitting will occur. It will be appreciated that a cylindrical stem and locking tab could also be incorporated.

Turning now to FIGS. 4A–4D, the actuating pin 28 is positioned in the throughbore 22 with the stem 34 inserted through the coil spring 26 within the spring retention chamber 64 such that the locking tab 36 projects radially inwardly and the latch head 74 is positioned in the enlarged latch chamber 66. The latch head 74 being axially wider than the spring retention chamber 64 is inhibited from entering the spring retention chamber as the stop surface 94*a*, 94*b* of the latch head 74 encounters the bottom wall 68 of the latch chamber as the latch head travels radially inwardly toward the central bore. The stop surface 94*a*, 94*b* also rests atop the second end 72 of the spring 26 and is supported by the spring to bias the actuating pin 28 in a radially outward condition. In contrast to the latch head 74, the relatively slender stem 34 and locking tab 36 are sized to pass between the retention shoulder 24 to enter the central bore 18 if the pin is depressed to a locking position as will be described below in more detail.

Figure 6:
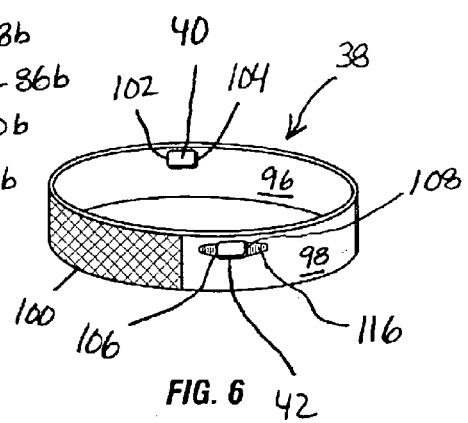
FIG. 6 is elevated perspective view, in enlarged scale, of the locking ring of the preferred embodiment illustrated in FIG. 1.

Referring now to FIG. 6, the locking ring 38 is a cylindrically shaped ring or band having an inner diameter selected to be slightly greater than the outside diameter of the collar 20 so the locking ring fits over the collar in a concentric and close fitting arrangement. The inner surface 96 of the locking ring is smooth to reduce the frictional resistance when turning the locking ring relative to the collar. The outer surface 98 of the locking ring includes at least one knurled section 100 to assist the operator in turning the locking ring.

Figure 4D:
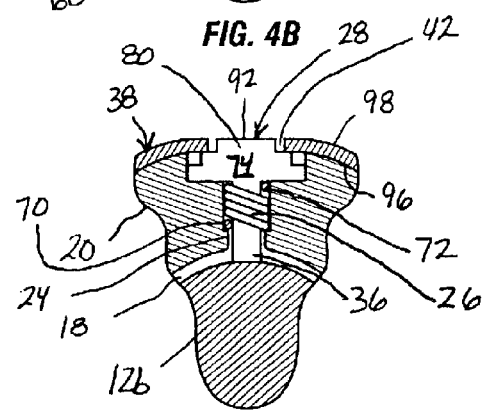
FIG. 4D is a partial axial cross-sectional view, in enlarged scale, taken along lines 4D—4D of FIG. 4C.

With continued reference to FIG. 6, spaced between the knurled section is a first slot or unlocking slot 40 and a second slot or locking slot 42. Both slots are generally rectangular with the long sides projecting in the circumferential direction and the short sides projecting in the axial direction. In this exemplary embodiment, the slots 40 and 42 are diametrically opposed but may be placed at other positions along the locking ring. Both slots 40 and 42 have the same axial width dimension, as viewed in FIG. 2, however, the circumferential or arc length of the unlocking slot (FIG. 4B) is greater than the arc length of the locking slot (FIG. 4D). The unlocking slot 40 is defined by a spaced apart first sidewall 102 and an opposing sidewall 104, either of which may be a leading slot edge or trailing slot edge depending on the direction of rotation of the locking ring which is rotatable in either direction on the collar. The locking slot 42 is constructed similarly except the first and opposing sidewalls 106 and 108 are spaced closer together along the circumference of the ring 38. Sidewalls 102 and 104 are dimensioned to receive and engage the first catch 30 while sidewalls 106 and 108 are dimensioned to receive and engage the second catch 32. Such engagement between the sidewalls of the slots 40 and 42 of the locking ring 38 with the catches 30 and 32 of the actuating pin 28 inhibits rotation of the locking ring relative to the collar 20 and also disposes the locking tab 36 at different positions with relative to the central bore as will be explained below in more detail. Sidewalls 102, 104, 106, and 108 are greater in axial width than the axial width of the actuating pin 28 (FIGS. 4A and 4C).

More specifically, referring to FIGS. 5–6, the sidewalls 102, 104 of the unlocking slot 40 are spaced slightly farther apart in the transverse and circumferential direction than the edges 86*a*, 86*b* of the second tier 78 of the locking pin but less than the transverse length between the edges 82*a*, 82*b*. Thus, the button 80 and second tier 78 may project into and through the unlocking slot 40 but the first tier is restricted from passing through the unlocking slot 40 due to the interference of edges 84*a*, 84*b* with the interior surface 96 of the locking ring 38. When the actuating pin 28 is engaged with the unlocking slot 40, the side walls 102 and 104 and the interior surface 96 of the locking ring 38 engage the first catch 30 of the actuating pin 28 to position the stem 34 and locking tab 36 within the throughbore 22 and outside of the central bore 18 (FIGS. 4A and 4B).

The distance between the sidewalls 106, and 108 of the locking slot 42 are only slightly larger than the transverse length of the button 80 as defined by edges 90*a*, 90*b*. Thus, the button 80 may project into the locking slot 42 but the second tier 78 is inhibited from entering the slot due to the interference between the edges 88a, 88b with the interior surface 96 of the locking ring 38. In this position, the side walls 106 and 108 and interior surface 96 of the locking ring 38 adjacent the locking slot 42 engages the second catch 32 of the actuating pin to position the locking pin further into the throughbore 22 to dispose the locking tab 36 in the central bore 18 (FIGS. 4C and 4D).

With the following description, it will be appreciated that the self-locking coupling device 10 may couple to a grooved hollow fitting 12a, 12b and also couple a grooved fitting to another fitting, which in the following example, is a hollow threaded fitting 50. When the fittings and coupling body 16 are coupled, fluid or gas may flow through the assembly.

The following example assumes the first fitting 50 is attached to a conduit 110 in a conventional manner and may be fixed in place or free to move. The second fitting 12a (FIG. 1) includes an annular groove 14 having opposing radially projecting sidewalls 111 and 113, and an alignment shoulder 114 spaced apart from the groove 14 by an axially projecting spacer 115. The grooved fitting 12 also includes a conduit attachment collar 117 for attaching to a conduit 112. The grooved fitting 12b (FIG. 4A) includes similar features except the spacer and groove are integrated together. The locking pin 38 is also assumed to be initially in an unlocked position with the button 80 projecting through the unlocked slot 40 which engages the first catch 30 surfaces (FIG. 4B) so that the locking tab 36 is disposed within the throughbore 22.

To couple the first fitting 50 having an external threaded region 48 to the second fitting 12b having an annular groove 14 and an alignment shoulder 114, the operator may initially grasp the coupling body 16 and grooved fitting 14 to align the central longitudinally projecting axis of the central bore 18 of the coupling body 16 with the central longitudinal axis of the grooved fitting 12. As viewed in FIG. 1, the alignment shoulder 114 faces to the left and the stop shoulder 54 of the coupling body 16 faces the right. This is transposed in FIGS. 4A and 4C. With continued reference to FIGS. 1–3, the grooved fitting 12 is inserted into the central bore 18 of the coupling body until the alignment shoulder 114 abuts the stop shoulder 54 thus disposing the groove 14 in axial alignment with the locking tab 36 (FIGS. 3 and 4A). With the locking tab 36 in the unlocked position (FIG. 4A), it will not interfere with the insertion of the grooved fitting 12 into the central bore 18.

The operator may then depress the button 80 by pushing against the top edge surface 92, which may be rounded and bulbous to present a greater depressable area, to drive the top edge 92 of the locking pin 28 beneath the inner surface 96 of the unlocking slot 40 of the locking ring 38 so that the locking ring is free to rotate in either direction relative to the collar 20. The indicator 116 around the smaller locking slot 42 may also be in the form of small depressions to present the operator with more access to the button 80. With the button 80 depressed, the operator may then grasp the locking ring 38 between the thumb and forefinger on the knurled section 100 and rotate the locking slot 42 about 180 degrees toward the locking pin 28. As the locking ring is rotated, the spring 26 outwardly biases the top edge 92 of the button 80 against the interior surface 96 of the locking ring 38. In this example, it will be assumed that the locking ring is rotated counterclockwise when viewed from the left hand end as viewed in FIG. 1. Thus, the leading edge of the locking slot is side wall 108. As the leading edge side wall 108 passes the back edge of the button, edge 90a in this example, that is the edge further away in the direction of travel, the button will spring radially outwardly into the locking slot 42 with an audible click sound to engage the second catch 32 with the sidewalls 106, 108 and interior surface 96 adjacent the locking slot 42 (FIGS. 4C and 4D).

In this position, the top edge of the button 80 is substantially flush with the outer surface 98 of the locking ring 38 (FIGS. 4C and 4D). The second catch 32 engages the edge walls 106 and 108 of the locking slot 42 to interfere with further rotation of the locking ring. In this position, the edges 88a, 88b of the second catch 32 press against the interior surface 98 of the locking ring 38 adjacent the slot walls 106, 108 to position the locking pin in a locking position with the locking tab extended into the central bore 18 to project into the groove 14 of fitting 12 (FIGS. 4C and 4D). As the alignment shoulder 114 limits axial movement of the fitting in one direction due to interference from the stop shoulder 54, the locking tab 34 inhibits axial movement of the fitting 12 due to interference from one or both of the side walls 111, 113 of the groove 14 which may be spaced apart from the alignment shoulder 114 by a spacer 113 (FIGS. 1–2).

The coupling attachment collar 117 of the grooved fitting 12 is then coupled to a conduit 112 using conventional methods such as crimping, swaging, or other suitable method and may be coupled to the inner diameter or outer diameter as required. It will be appreciated that if the grooved fitting does not have an alignment shoulder 114 that interferes with axial movement of the fitting 12 through the coupling body 16, the coupling body may be inserted over the grooved fitting after the grooved fitting is connected to the conduit. The conduit 112 may also be inserted through the coupling body to be connected to the grooved fitting and the coupling body slid back along the conduit to engage the grooved fitting. The operator may then grasp the first fitting 50 and insert the external threaded region 48 into the internal threaded region 46 of the head section 44 of the coupling body 16 and then screw the coupling body onto the first fitting 50. The coupling between the threaded fitting 50 and coupling body 16 may be tightened using a tool such as a crescent wrench or over suitable tool as would be understood by one of ordinary skill in the art. At this point, the threaded fitting 50 is coupled to the grooved fitting 12 via the self-locking coupling device 10 as illustrated in FIGS. 3, 4C and 4D. In practice, the first and second fitting are hollow and coupled to a conduit, piping, hose, or other suitable fluid or gas transfer medium such that fluid or gas may flow from one fitting to the other fitting via the coupling body.

To uncouple the first or grooved fitting 12 from the second fitting 50 and the coupling body 16, the coupling body is initially unscrewed from the second fitting and separated. To release the coupling body 16 from the grooved fitting 12, the operator may depress the button 80 of the locking pin 28 beneath the inner surface 96 of the locking ring 38 as before so the locking ring is free to rotate. As the operator rotates the locking ring using the knurled section 100, the locking tab 36 continues to project into the groove 14 so inadvertent uncoupling of the grooved fitting 12 from the coupling body 16 will not occur. Assuming the operator rotates the locking ring in a clockwise direction, once the leading edge 104 clears the back edge 90b of the button, away from the direction of rotation, the spring 26 biases the pin 28 radially outwardly and the button 80 will enter the unlocking slot 40. At this point, the leading edge shoulder 88b of the second tier 78 abuts the interior surface 96 of the locking ring 38 and the locking tab 36 is still engaged in the locking position. Continued rotation of the locking ring by the operator moves the leading edge 104 of the unlocking slot 42 past the edge 86b of the second tier 78 and the spring 26 drives the pin 28 outwardly a discrete distance further forcing the shoulders 84a, 84b the first tier 76 against the inner surface 96 of the locking ring 38 with an audible second click (FIG. 4B). In this unlocked position, the top edge 92 of the button 80 extends radially outwardly of exterior surface 98 of the locking ring 38 slightly. Also, the locking tab 36 has withdrawn into the throughbore 22 and out of the central bore 18. The radial innermost end of the locking tab may be flush with the surface of the central bore. While this example has been described in terms of a particular locking ring direction of rotation for locking and unlocking the grooved fitting, it will be appreciated that, in rotating the locking ring in the opposite directions to those described above, the leading and trailing edges of the slot sidewalls and front and back edges of the actuating pin will transpose.

It will be appreciated that in practice, it is common that the conduits connected to the fittings are fixed in place. Thus, the coupling body is initially uncoupled from the threaded fitting and then uncoupled from the grooved fitting. The coupling body is then axially displaced relative to the grooved fitting to provide access to the mating or abutment region between the grooved fitting and the threaded fitting which may be separated using a suitable conventional method as determined by the operator.

The grooved fitting 12 may then be withdrawn in an axial direction away from the coupling body 16 and set aside. It will be appreciated that the addition of the grooves or depressions 116 (FIG. 6), or other suitable indicia, facilitate inspection of the locking ring on the coupling body to determine whether the locking pin is in the locked position (FIGS. 4B, 4D) or unlocked position (FIGS. 4A, 4C). Such indicia may includes a raised dot so an operator can determine the position of the locking ring in the event the locking slot is not readily visible. The mating between the threaded fitting 50 and coupling body 16 may take other suitable forms such as quick disconnects, bayonet type fittings, or another collar section with locking pin and locking ring. One suitable material for components described herein is a titanium alloy although other suitable metallic or plastic materials may be used.

While the above embodiments have been described to couple with an annularly grooved fitting, a fitting including a radially outwardly facing groove that does not encircle the fitting and is dimensioned to receive the locking tab is also contemplated. The annular groove is preferred as the operator does not have to worry about the radial alignment of the groove with the locking tab when coupling the components together. In addition, an actuating pin in the form of the cross-hatched region or outlined region of the pin illustrated in FIG. 5 may also be used. Such half-pin would include first and second catches on one side of the pin only.

The embodiments described herein are not meant to be limiting with respect to dimension. The size of the coupling body may vary to accommodate the fittings to be coupled. It is also contemplated that the coupling body may include an externally threaded section for mating to a fitting with a complementary internally threaded section.

In addition, other modifications and improvements may be made to the self-locking nut assembly without departing from the scope of the invention. For example, while the embodiment described herein includes diametrically opposed slots, this is not meant to be limiting and other suitable slot positions will occur to one or ordinary skill in the art. In addition, if more than one locking pin is used, additional slots may be added.

What is claimed is:

1. A self-locking coupling device for coupling to a fitting including an annular groove, said coupling device comprising:
    a coupling body having a central bore and an axially extending collar including at least one radially projecting throughbore having a retention shoulder proximate its radial inner end;
    a spring element received in said throughbore with one end abutting said retention shoulder;
    an actuating pin including a radially projecting stem terminating in a locking tab, said actuating pin being inserted through said spring element to cooperate with said spring element to radially outwardly bias said actuating pin, said actuating pin further including a first catch and a second catch proximate its opposing end; and
    a rotatable locking ring mounted concentrically about said collar in close fitting relationship, said ring including a first slot and a second slot, said first and second slots corresponding to said first and second catches, said locking ring being operable to rotate relative to said collar to engage said first catch with said first slot to dispose said locking tab within said throughbore and also operable to rotate so as to engage said second catch with said second slot to dispose said locking tab within said central bore to engage, when axially aligned therewith, said groove of said fitting to restrict axial displacement of said coupling body relative to said fitting.

2. The self-locking coupling device as set forth in claim 1 further including:
    a head portion adjacent to said collar and including a threaded region for coupling to a complementary threaded surface of a second fitting.

3. The self-locking coupling device as set forth in claim 2 wherein:
    said head portion includes an exterior faceted surface for receipt of a tool for rotating said coupling assembly.

4. The self-locking coupling device as set forth in claim 1 wherein:
    said coupling body is in the form of a hex-head nut with a head section having internal threading and a shoulder at its innermost end, said head section being adjacent to said collar.

5. The self-locking coupling device as set forth in claim 1 wherein:
    said first slot is larger in circumferential length than said second slot.

6. The self-locking coupling device as set forth in claim 1 wherein;
    said slots are diametrically opposed on said locking ring.

7. The self-locking coupling device as set forth in claim 1 wherein:
    at least a portion of the exterior surface of said locking ring includes a knurled region.

8. The self-locking coupling device as set forth in claim 1 wherein:
    said spring element is a coil spring.

9. The self-locking coupling device as set forth in claim 1 wherein:
    said collar terminates at its outermost edge in a retention flange at least one or more portions of which are bent from a substantially axial direction to a substantially radial direction to retain said locking ring on said collar.

10. The self-locking coupling device as set forth in claim 1 wherein:

said coupling body includes a head section separated from said collar section by a flange having a diameter larger than said locking ring.

11. The self-locking coupling device as set forth in claim 1 wherein:

said locking ring includes an indicator indicating the position of said locking tab when said pin engages at least one of said slots.

12. The self-locking coupling device as set forth in claim 11 wherein:

said indicator is a pair of grooves on either side of said second slot.

13. The self-locking coupling device as set forth in claim 1 wherein:

said pin includes a radially projecting button which extends through said first slot when said pin is in an unlocked position and projects into said second slot when said pin is in a locked position.

14. The self-locking coupling device as set forth in claim 13 wherein:

said button includes rounded edges.

15. The self-locking coupling device as set forth in claim 1 wherein:

said locking ring and said pin cooperate to create an audio signal when said pin engages either of said slots.

16. The self-locking coupling device as set forth in claim 1 wherein:

said pin is generally T-shaped in axial cross section and includes a first pair of L-shaped shoulders forming said first catch and a second pair of L-shaped shoulders forming said second catch, said first catch shoulders being spaced further apart in a transverse direction than said second catch shoulders.

17. The self-locking coupling device as set forth in claim 1 wherein:

said throughbore includes a radially interior retention chamber including said retention shoulder and an adjacent enlarged latch chamber wherein said catches are disposed.

18. The self-locking coupling device as set forth in claim 1 wherein:

a width of said locking tab is preselected to be slightly less than said groove of said fitting to be engaged.

19. The self-locking coupling device as set forth in claim 17 wherein:

said pin includes an enlarged latch head on said stem, said latch head including a stepped body with a first tier cooperating with a second tier to form said first catch and a second tier cooperating with a third tier to form said second catch, said third tier including an outwardly facing button for depressing said locking pin.

20. The self-locking coupling device as set forth in claim 1 wherein:

said coupling body includes an internal shoulder in said central bore for abutting a shoulder of said grooved fitting, when inserted therein, to axially align said annular groove with said locking tab.

21. A self-locking coupling device comprising:

an elongated nut body including a faceted head section separated from an adjacent axially extending collar by a flange having a diameter greater than said collar, said body including an axially projecting cylindrical bore having a threaded section interior of said head section and terminating in a first shoulder, said collar defining a radially projecting throughbore with a spring retention chamber terminating in a bottom retention shoulder and an enlarged latch chamber disposed radially outwardly of said spring retention chamber;

a coil spring received in said spring retention chamber with one end of said spring abutting said bottom retention shoulder;

an actuating pin with a multi-tiered latch head atop a radially inwardly projecting stem terminating in a locking tab, said latch head being supported by said coil spring to radially outwardly bias said pin, said latch head including a first catch with a length in transverse cross section greater than a second catch; and a rotatable locking ring mounted concentrically about collar in close fitting relationship, said locking ring including a locking slot and an unlocking slot, said locking and unlocking slots corresponding to said first and second catches, said unlocking slot being greater in circumferential length than said locking slot, said locking ring being operable to rotate relative to said collar to capture said first catch with said unlocking slot to dispose said locking tab within said throughbore and further being operable to rotate relative to said collar to capture said second catch with said locking slot to dispose said locking tab within said central bore to engage said groove of said fitting when axially aligned therewith.

* * * * *